United States Patent
Hao et al.

(10) Patent No.: US 8,693,354 B2
(45) Date of Patent: Apr. 8, 2014

(54) METHOD FOR GENERATION OF CYCLIC SHIFT AMOUNT SET AND METHOD FOR GENERATION OF RANDOM ACCESS PREAMBLE

(75) Inventors: Peng Hao, Shenzen (CN); Bin Yu, Shenzhen (CN); Shuqiang Xia, Shenzhen (CN); Bo Dai, Shenzhen (CN); Chunli Liang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 212 days.

(21) Appl. No.: 12/812,463

(22) PCT Filed: Dec. 30, 2008

(86) PCT No.: PCT/CN2008/002136
§ 371 (c)(1),
(2), (4) Date: Jul. 12, 2010

(87) PCT Pub. No.: WO2009/094849
PCT Pub. Date: Aug. 6, 2009

(65) Prior Publication Data
US 2011/0007825 A1    Jan. 13, 2011

(30) Foreign Application Priority Data
Jan. 17, 2008  (CN) .......................... 2008 1 0003371

(51) Int. Cl.
*H04W 24/00* (2009.01)
(52) U.S. Cl.
USPC .......................................... 370/252; 370/329
(58) Field of Classification Search
USPC .......... 370/329, 330, 252; 455/419, 436, 525; 375/259, 260
See application file for complete search history.

(56) References Cited

U.S. PATENT DOCUMENTS

| 2009/0073944 A1* | 3/2009 | Jiang et al. | ..................... 370/338 |
| 2010/0220664 A1* | 9/2010 | Hooli et al. | ................... 370/329 |
| 2010/0284350 A1* | 11/2010 | Korhonen et al. | ............ 370/329 |

FOREIGN PATENT DOCUMENTS

| CN | 101094027 A | 12/2007 |
| CN | 101094529 A | 12/2007 |
| CN | 101217807 A | 7/2008 |
| WO | 2007126793 A2 | 11/2007 |

OTHER PUBLICATIONS

International Search Report in international application No. PCT/CN2008/002136, mailed Apr. 9, 2009.
English Translation of the Written Opinion of the International Search Authority in international application No. PCT/CN2008/002136, mailed Apr. 9, 2009.
3GPP TSG RAN WG1 Meeting #49bis, R1-072863.
3GPP TSG RAN WG1 Meeting #49bis, R1-072898.
Cyclic Shift Configuration Set for Non-Synchronized RACH.

* cited by examiner

*Primary Examiner* — Rasheed Gidado
(74) *Attorney, Agent, or Firm* — Oppedahl Patent Law Firm LLC

(57) ABSTRACT

A method for generation of Ncs set is disclosed as: an upper limit value Ncs_max of Ncs is determined firstly, Ncs values which are less than or equal to the Ncs_max are selected to be elements of an initial Ncs set, a screening Ncs set is generated from the initial Ncs set, and then a final Ncs set is generated from the screening Ncs set. The final Ncs set can satisfy the maximal covering demand of the system, and when a random access preamble is generated by cyclic shift amount contained in the final Ncs set, the interference between and in cells can be decreased.

18 Claims, 2 Drawing Sheets

METHOD FOR GENERATION OF CYCLIC SHIFT AMOUNT SET AND METHOD FOR GENERATION OF RANDOM ACCESS PREAMBLE

TECHNICAL FIELD

The present invention relates to a method for generation of cyclic shift amount set and a method for generation of random access preamble of random access channel in wireless communication system.

BACKGROUND

FIG. 1 is a frame structure of Time Division Duplex (TDD) mode in Long Term Evolution (LTE) system. In the frame structure, a 10 ms radio frame is divided into two half-frames, and each half-frame is divided into 10 time slots (number from 0 to 9) with a length of 0.5 ms respectively, and two time slots constitute a subframe with a length of 1 ms, and each half-frame consists of five subframes (number from 0 to 4). Wherein, subframe 0 is fixedly used for downlink, and subframe 1 is a special subframe containing 3 particular time slots, which are Downlink Pilot Time Slot (DwPTS), Guard Period (GP) and Uplink Pilot Time Slot (UpPTS) receptively. The former n subframes after subframe 1 are used for uplink transmission ($1 \leq n \leq 3$), and the latter 3-n subframes are used for downlink transmission. Random access channel may be transmitted either in the UpPTS or in other uplink subframes, but the structures of this two random access channels are different.

In the LTE system, Random Access Channel (RACH) uses cyclic shift sequences of Zadoff-Chu (ZC) sequence as preamble, and these cyclic shift sequences can also be called Zero Correlation Zone (ZCZ) sequences.

In the LTE system, mobile phone first executes downlink synchronization after being turned on, and then begins to detect Broadcast Channel (BCH). Base station informs the mobile phone via the BCH about the available index of the first ZC sequence and step size of cyclic shift (i.e. cyclic shift amount) of the RACH in the cell, and the mobile phone uses a certain mapping rule to calculate sequence numbers of corresponding ZC sequences according to the index, and then generates available ZCZ sequences according to cyclic shift step size and a certain cyclic shift restriction rule. If the amount of the ZCZ sequences is less than a threshold M, the mobile phone increases sequence index by degrees automatically, and uses the next ZC sequence to continue generating ZCZ sequences until the total amount of ZCZ sequences is greater than or equal to said threshold. In the end, the mobile phone randomly selects one sequence from all generated available ZCZ sequences as a random access preamble (hereinafter referred to as preamble for short) to send.

The selection of cyclic shift amount (Ncs) affects system performances. If the cyclic shift amount is too great, the amount of the ZCZ sequences generated by each ZC sequence will become smaller, so that the reuse factor of ZC sequence decrease (reuse factor is defined as amount of cells using different ZC sequences), and the interference between cells increase; if the cyclic shift amount is too small, the supported covering range will become too small to satisfy the demond of networking. Furthermore, unreasonable design of the cyclic shift amount will also decrease the complete orthogonal probability of two preambles and increase the interference between users in cells.

Therefore, it is necessary to design a set of reasonable cyclic shift amount to satisfy maximal covering demand of the system, furthermore, under the condition of different covering demands, a suitable cyclic shift amount can be selected to make ZC sequence reuse factor reach the maximum and make two preambles reach the highest orthogonal probability. There has no related technical solution in existing technology yet.

SUMMARY

The technical problem the present invention aims to solve is to overcome the deficiency of existing technology, and the present invention provides a method for generation of suitable Ncs set under the condition of satisfying the maximal covering demand of the system, so as to decrease the interference between and in cells when random access preamble is generated by cyclic shift amount of random access channel contained in the set.

To solve above problem, the present invention provides a method for generation of cyclic shift amount set, and the method comprises the following steps:

A: determining an upper limit value Ncs_max of cyclic shift amount Ncs according to a maximum cell radius value which is required to be supported by a random access channel RACH, and selecting Ncs values which are less than or equal to the Ncs_max to be elements of an initial Ncs set;

B: calculating a root sequence number Nr corresponding to each element in the initial Ncs set according to formula Nr=⌈M/⌊Npre/Ncs⌋⌉; and deleting elements in the initial Ncs set which have the same Nr value with other elements so as to generate a screening Ncs set in which each element has a different Nr value;

C: if N, the number of elements in the screening Ncs set, is greater than P, the number of maximum Ncs supported by the system, then deleting N-P elements from the set so as to generate a final Ncs set; else regarding the screening Ncs set as the final Ncs set;

wherein, M is a preamble number required by each cell; Npre is the length of preamble sequence.

Further, in the step A, the Ncs values which are greater than or equal to Ncs_min but also less than or equal to the Ncs_max may be regarded as elements of the initial Ncs set; wherein, $$\text{Ncs\_min} = \left\lfloor \frac{Tds \times Npre}{Tpre} \right\rfloor;$$

or Ncs_min is the maximum value of $$\left\lfloor \frac{Tds \times Npre}{Tpre} \right\rfloor$$

and defined threshold Ncs_th.

Further, in the step B, for those multiple elements which have the same Nr value in the initial Ncs set, the element which has the minimum Ncs value may be reserved, the other elements may be deleted, and the screening Ncs set in which each element has a different Nr value may be generated.

Further, in the step C, if the N is greater than the P, P-1 Ncs values arranged from low to high in the screening Ncs set and the maximum Ncs value in the screening Ncs set may be regarded as elements of the final Ncs set, and the other N-P elements may be deleted.

Further, if R=1.4 km, Tpre=133 us, Npre=139 or 137, Tds=5.2 us, Ncs_th=7, M=64, P=4, then the final Ncs set is {8, 10, 12, 15};

if R=1.4 km, Tpre=133 us, Npre=139 or 137, Tds=5.2 us, Ncs_th=7, M=64, P=2, then the final Ncs set is {8, 15};

if R=1.4 km, Tpre=133 us, Npre=139 or 137, Tds=5.2 us, Ncs_th=7, M=64, P=3, then the final Ncs set is {8, 10, 15};

if R=1.4 km, Tpre=133 us, Npre=139 or 137, Tds=5.2 us, Ncs_th=7, M=64, P=1, then the final Ncs set is {15};

if R=1.55 km, Tpre=133 us, Npre=139 or 137, Tds=5.2 us, Ncs_th=7, M=64, P=1, then the final Ncs set is {16};

if R=1.26 km, Tpre=133 us, Npre=139 or 137, Tds=5.2 us, Ncs_th=7, M=64, P=1, then the final Ncs set is {14};

if R=1.11 km, Tpre=133 us, Npre=139 or 137, Tds=5.2 us, Ncs_th=7, M=64, P=1, then the final Ncs set is {13};

if R=1.0 km, Tpre=133 us, Npre=139 or 137, Tds=5.2 us, Ncs_th=7, M=64, P=1, then the final Ncs set is {12};

if R=0.82 km, Tpre=133 us, Npre=139 or 137, Tds=5.2 us, Ncs_th=7, M=64, P=1, then the final Ncs set is {11};

if R=0.68 km, Tpre=133 us, Npre=139 or 137, Tds=5.2 us, Ncs_th=7, M=64, P=1, then the final Ncs set is {10};

if R=0.53 km, Tpre=133 us, Npre=139 or 137, Tds=5.2 us, Ncs_th=7, M=64, P=1, then the final Ncs set is {9};

if R=0.39 km, Tpre=133 us, Npre=139 or 137, Tds=5.2 us, Ncs_th=7, M=64, P=1, then the final Ncs set is {8};

if R=0.24 km, Tpre=133 us, Npre=139 or 137, Tds=5.2 us, Ncs_th=6, M=64, P=1, then the final Ncs set is {7};

if R=0.1 km, Tpre=133 us, Npre=139 or 137, Tds=5.2 us, Ncs_th=6, M=64, P=1, then the final Ncs set is {6};

if R=1.55 km, Tpre=133 us, Npre=139 or 137, Tds=5.2 us, Ncs_th=6, M=64, P=4, then the final Ncs set is {6, 8, 10, 16};

if R=1.4 km, Tpre=133 us, Npre=139 or 137, Tds=5.2 us, Ncs_th=6, M=64, P=4, then the final Ncs set is {6, 8, 10, 15};

if R=1.4 km, Tpre=133 us, Npre=139 or 137, Tds=5.2 us, Ncs_th=6, M=64, P=2, then the final Ncs set is {6, 15};

if R=1.4 km, Tpre=133 us, Npre=139 or 137, Tds=5.2 us, Ncs_th=6, M=64, P=3, then the final Ncs set is {6, 8, 15};

if R=1.4 km, Tpre=133 us, Npre=139 or 137, Tds=5.2 us, Ncs_th=6, M=16, P=2, then the final Ncs set is {8, 15};

if R=1.4 km, Tpre=133 us, Npre=139 or 137, Tds=5.2 us, Ncs_th=6, M=16, P=1, then the final Ncs set is {15};

if R=0.4 km, Tpre=133 us, Npre=139 or 137, Tds=5.2 us, Ncs_th=6, M=16, P=1, then the final Ncs set is {8};

if R=1.6 km, Tpre=133 us, Npre=139 or 137, Tds=5.2 us, Ncs_th=6, M=16, P=2, then the final Ncs set is {8, 16};

if R=1.6 km, Tpre=133 us, Npre=139 or 137, Tds=5.2 us, Ncs_th=6, M=16, P=1, then the final Ncs set is {16};

if R=1.5 km, Tpre=133 us, Npre=139 or 137, Tds=0 us, Ncs_th=2, M=16, P=2, then the final Ncs set is {8, 10};

if R=1.2 km, Tpre=133 us, Npre=139 or 137, Tds=0 us, Ncs_th=2, M=16, P=2, then the final Ncs set is {8};

if R=1.5 km, Tpre=133 us, Npre=139 or 137, Tds=0 us, Ncs_th=2, M=16, P=1, then the final Ncs set is {10};

if R=1.5 km, Tpre=133 us, Npre=139 or 137, Tds=0 us, Ncs_th=2, M=64, P=4, then the final Ncs set is {2, 4, 6, 10};

if R=1.0 km, Tpre=133 us, Npre=139 or 137, Tds=5.2 us, Ncs_th=7, M=64, P=2, then the final Ncs set is {8, 12};

if R=1.11 km, Tpre=133 us, Npre=139 or 137, Tds=5.2 us, Ncs_th=7, M=64, P=2, then the final Ncs set is {8, 13};

if R=1.26 km, Tpre=133 us, Npre=139 or 137, Tds=5.2 us, Ncs_th=7, M=64, P=2, then the final Ncs set is {8, 14};

if R=1.5 km, Tpre=133 us, Npre=139 or 137, Tds=0 us, Ncs_th=6, M=64, P=2, then the final Ncs set is {6, 10};

if R=1.5 km, Tpre=133 us, Npre=139 or 137, Tds=0 us, Ncs_th=4, M=64, P=2, then the final Ncs set is {4, 10};

if R=1.5 km, Tpre=133 us, Npre=139 or 137, Tds=0 us, Ncs_th=2, M=64, P=2, then the final Ncs set is {2, 10};

if R=1.2 km, Tpre=133 us, Npre=139 or 137, Tds=0 us, Ncs_th=2, M=64, P=4, then the final Ncs set is {2, 4, 6, 8};

if R=1.5 km, Tpre=133 us, Npre=139 or 137, Tds=0 us, Ncs_th=4, M=64, P=4, then the final Ncs set is {4, 6, 8, 10};

if R=1.2 km, Tpre=133 us, Npre=139 or 137, Tds=0 us, Ncs_th=6, M=64, P=2, then the final Ncs set is {6, 8};

if R=1.2 km, Tpre=133 us, Npre=139 or 137, Tds=0 us, Ncs_th=4, M=64, P=2, then the final Ncs set is {4, 8};

if R=1.2 km, Tpre=133 us, Npre=139 or 137, Tds=0 us, Ncs_th=2, M=64, P=2, then the final Ncs set is {2, 8};

if R=0.9 km, Tpre=133 us, Npre=139 or 137, Tds=0 us, Ncs_th=2, M=64, P=2, then the final Ncs set is {2, 6};

if R=0.9 km, Tpre=133 us, Npre=139 or 137, Tds=0 us, Ncs_th=4, M=64, P=2, then the final Ncs set is {4, 6};

if R=0.6 km, Tpre=133 us, Npre=139 or 137, Tds=0 us, Ncs_th=2, M=64, P=2, then the final Ncs set is {2, 4};

if R=0.6 km, Tpre=133 us, Npre=139 or 137, Tds=0 us, Ncs_th=2, M=64, P=1, then the final Ncs set is {4};

if R=0.3 km, Tpre=133 us, Npre=139 or 137, Tds=0 us, Ncs_th=2, M=64, P=1, then the final Ncs set is {2};

if R=2.2 km, Tpre=133 us, Npre=139 or 137, Tds=0 us, Ncs_th=2, M=64, P=7, then the final Ncs set is {2, 4, 6, 8, 10, 12, 15}; and if R=2.2 km, Tpre=133 us, Npre=139 or 137, Tds=0 us, Ncs_th=2, M=64, P=8, then the final Ncs set is {2, 4, 6, 8, 10, 12, 13, 15}.

Further, one of the following sets may be used as the final Ncs set:

{8, 10, 12, 15}; {8, 15}; {8, 10, 15}; {15}; {16}; {14}; {13}; {12}; {11}; {10}; {9}; {8}; {7}; {6}; {6, 8, 10, 16}; {6, 8, 10, 15}; {6, 15}; {6, 8, 15}; {8, 15}; {15}; {8}; {8, 16}; {16}; {8, 10}; {8}; {10}; {2, 4, 6, 10}; {8, 12}; {8, 13}; {8, 14}; {6, 10}; {4, 10}; {2, 10}; {2, 4, 6, 8}; {4, 6, 8, 10}; {6, 8}; {4, 8}; {2, 8}; {2, 6}; {4, 6}; {2, 4}; {4}; {2}; {2, 4, 6, 8, 10, 12, 15}; {2, 4, 6, 8, 10, 12, 13, 15}.

Further, in the step A, the following formula may be used to calculate the Ncs_max:

$$\text{Ncs\_max} = \left\lfloor \frac{(R \times 6.7 + Tds) \times Npre}{Tpre} \right\rfloor;$$

wherein, R is the maximum cell radius value which is required to be supported by the RACH, Tpre is the length of the preamble, and Tds is the length of multipath channel delay spread.

Further, in the step B, for those multiple elements which have the same Nr value in the initial Ncs set, the element which has the maximum Ncs value may be reserved, the other elements may be deleted, and the screening Ncs set in which each element has a different Nr value may be generated.

Further, in the step C, if the N is greater than the P, then

P−1 Ncs values arranged from high to low in the screening Ncs set and the minimum Ncs value in the screening Ncs set may be regarded as elements of the final Ncs set, and the other N−P elements may be deleted; or P Ncs values arranged from high to low in the screening Ncs set may be regarded as elements of the final Ncs set, and the other N−P elements may be deleted; or P Ncs values arranged from low to high in the screening Ncs set may be regarded as elements of the final Ncs set, and the other N−P elements may be deleted.

The present invention also provides a method for generation of random access preamble, and the method comprises:

selecting a cyclic shift amount Ncs from a cyclic shift amount set, and cyclically shifting v×Ncs for root Zadoff- Chu sequence at a predefined start point so as to generate a random access preamble of the root Zadoff-Chu sequence; wherein, $$v = 0, 1, \ldots, \lfloor N_{ZC}/Ncs \rfloor - 1, \quad Ncs \neq 0;$$

$N_{ZC}$ is the length of the root Zadoff-Chu sequence; the cyclic shift amount set is {2, 4, 6, 8, 10, 12, 15}.

Further, the predefined start point may be 0.

The Ncs set generated by the method of present invention can satisfy the maximal covering demand of the system. Furthermore, under the condition of different covering demands, a suitable cyclic shift amount can be selected to make ZC sequence reuse factor reach the maximum and make two preambles reach the highest orthogonal probability, therefore the interference between and in cells is decreased.

DETAILED DESCRIPTION

The present invention will be described in details hereinafter with reference to the drawings and embodiments.

Figure 1:
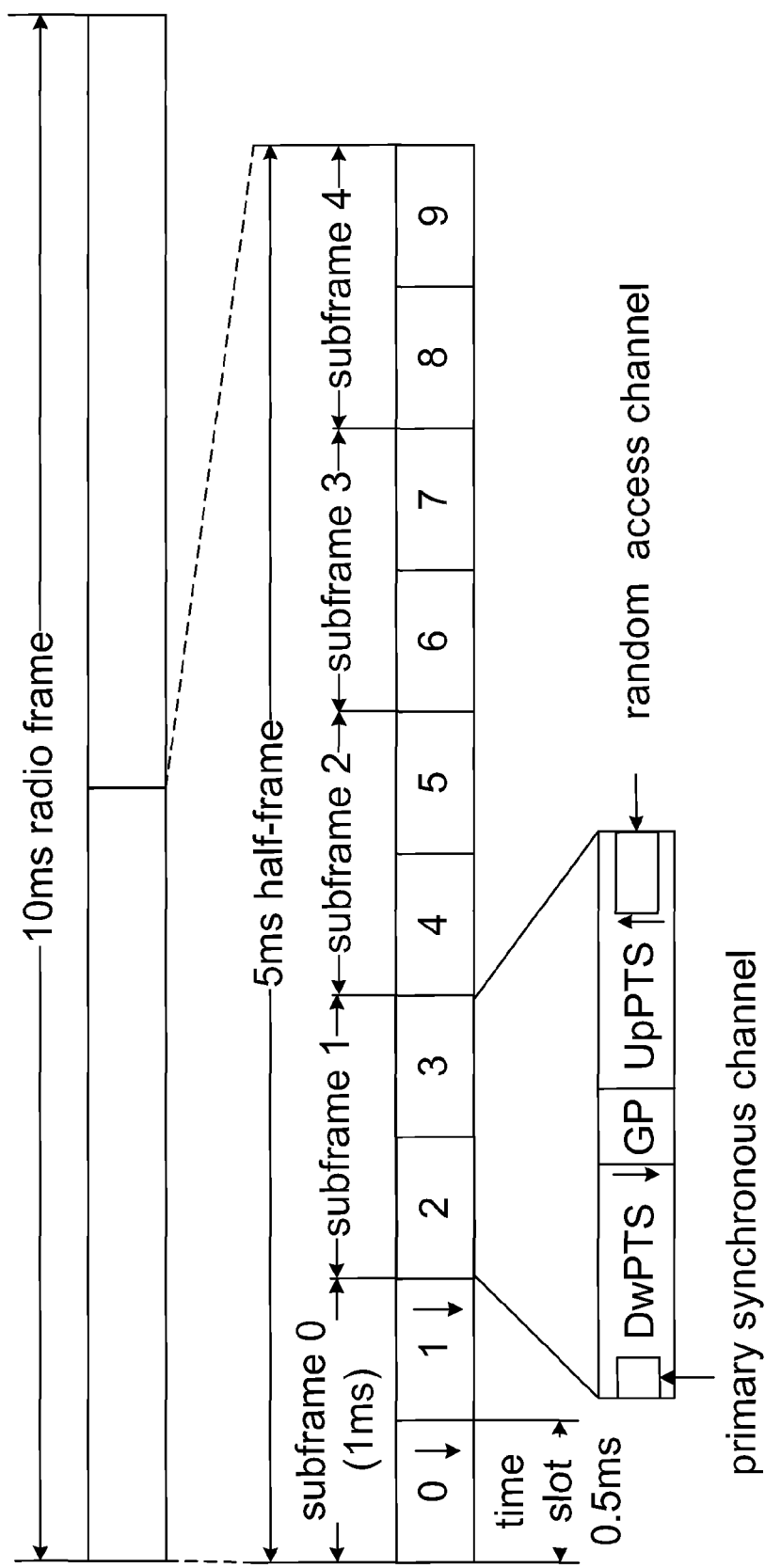
FIG. 1 is a diagram illustrating the frame structure of TDD mode in LTE system.
Figure 2:
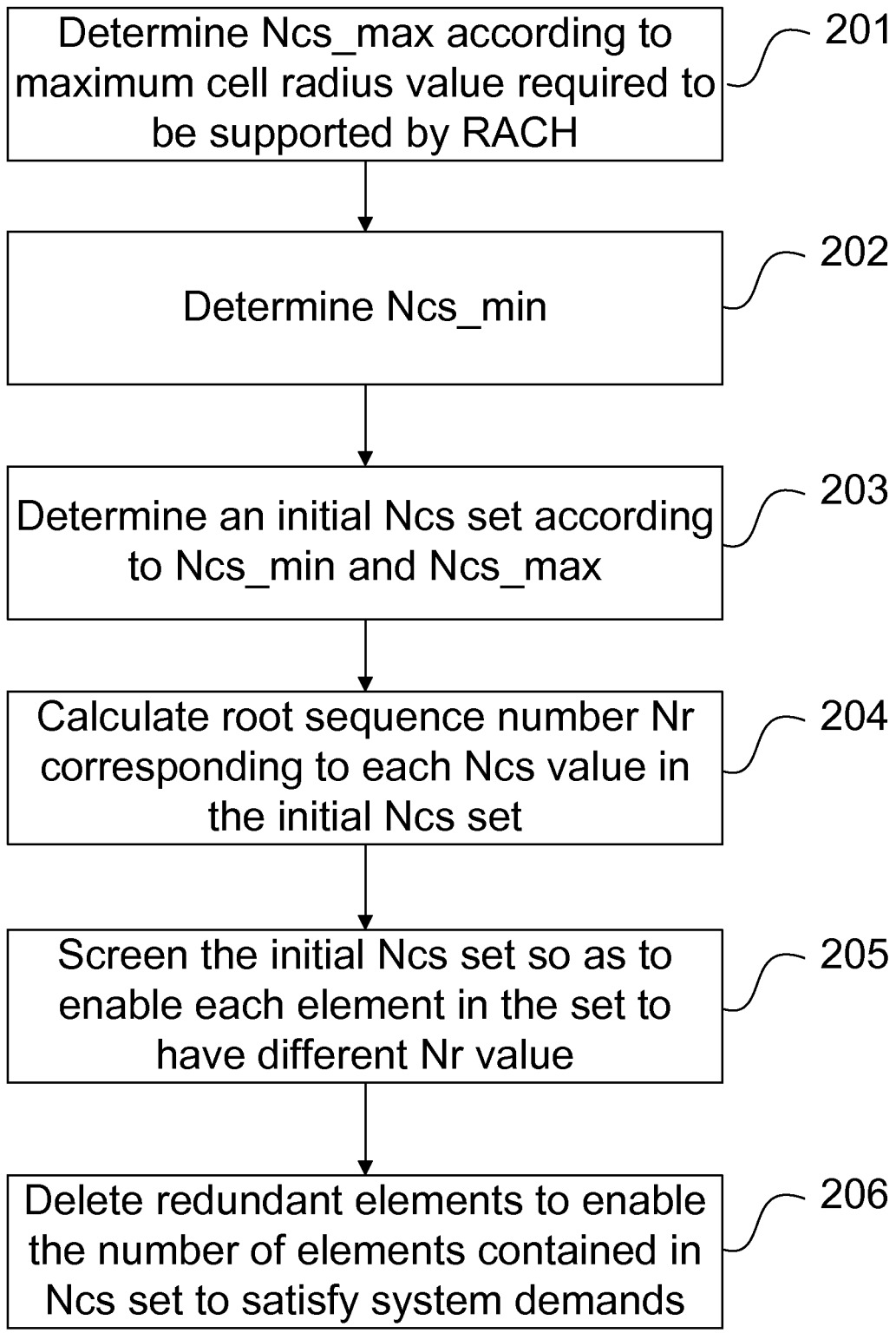
FIG. 2 is a flowchart illustrating a method for generation of cyclic shift amount set of random access channel in wireless communication system in an embodiment of the present invention.

FIG. 2 is a flowchart illustrating a method for generation of cyclic shift amount set of random access channel in wireless communication system in an embodiment of the present invention. As shown in FIG. 2, the method comprises the following steps:

201: determine an upper limit value Ncs_max of Ncs in Ncs set according to a maximum cell radius value which is required to be supported by RACH;

in this embodiment, the Ncs_max can be calculated by the following formula:

$$Ncs\_max = \left\lfloor \frac{(R \times 6.7 + Tds) \times Npre}{Tpre} \right\rfloor; \quad \text{(Formula 1)}$$

wherein, R is the maximum cell radius value which is required to be supported by the RACH, and the unit is km; Tpre is the length of preamble (or duration), and the unit is us; Npre is the length of preamble sequence; and Tds is the length of multipath channel delay spread; $\lfloor \bullet \rfloor$ denotes rounding down operation.

202: determine a lower limit value Ncs_min of Ncs in Ncs set;

generally, the Ncs_min can be calculated by the following formula:

$$Ncs\_min = \left\lfloor \frac{Tds \times Npre}{Tpre} \right\rfloor \quad \text{(Formula 2)}$$

further, design threshold Ncs_th according to requirement, regard the maximum value between the Ncs_min calculated by formula 2 and the Ncs_th as the final lower limit value Ncs_min of Ncs.

203: determine an initial Ncs set according to the Ncs_min and the Ncs_max, so as to enable any Ncs (integer) in the set is less than or equal to the Ncs_max, but also greater than or equal to the Ncs_min;

in other words, regard every integer which is less than or equal to the Ncs_max and greater than or equal to the Ncs_min as the element of the initial Ncs set.

204: calculate a root sequence number Nr corresponding to each Ncs value in the initial Ncs set according to the following formula:

$$Nr=\lceil M/\lfloor Npre/Ncs \rfloor \rceil \quad \text{(Formula 3)}$$

wherein, Nr is the root sequence number corresponding to cyclic shift amount Ncs;

M is the preamble number required by each cell; $\lceil \bullet \rceil$ denotes rounding up operation.

205: screen the initial Ncs set according to the calculated Nr value in the initial Ncs set, and generate a screening Ncs set in which each element (Ncs value) has a different Nr value;

in this embodiment, in multiple Ncs values with the same Nr value, reserve the maximum Ncs value, i.e. reserve the Ncs value which has the largest corresponding covering range.

Of course, the minimum Ncs value can also be reserved.

For example, there are Q Ncs values, each has a corresponding Nr value NR_1, then delete the minimum Q−1 values in these Q Ncs values from the initial Ncs set; repeat above operation, so as to make Nr value corresponding to each Ncs value in the initial Ncs set is different.

206: delete redundant elements in the Ncs set, so as to enable the number of Ncs values contained in the Ncs set to satisfy system demand;

in other words, if the maximum Ncs number supported by the system is P, and the number of elements (Ncs value) in the screening Ncs set generated in step 205 is N, and N>P, then delete N−P elements from the set.

In this embodiment, the final Ncs set can be composed of P−1 Ncs values which are selected from N elements in the screening Ncs set from low to high and the maximum Ncs value in the screening Ncs set.

Of course, the final Ncs set can also be composed of P−1 Ncs values selected from high to low and the minimum Ncs value in the initial Ncs set; or the final Ncs set can be composed of maximum or minimum P Ncs values from the set.

Hereinafter take the Ncs set {2, 4, 6, 8, 10, 12, 15} generated by above method of present invention for example, a method for generation of random access preamble by Ncs set generated according to the present invention is described.

If root ZC sequence is:

$$x_u(n) = e^{-j\frac{\pi u n(n+1)}{N_{ZC}}}, \quad 0 \leq n \leq N_{ZC} - 1;$$

perform cyclic shift to above root ZC sequence to generate random access preamble according to the following formula:

$$x_{u,v}(n) = x_u((n+C_v) \bmod N_{ZC});$$

wherein, as performing cyclic shift to above root ZC sequence beginning with position 0, the value of $C_v$ is:

$$C_v = \begin{cases} vNcs & v = 0, 1, \ldots, \lfloor N_{ZC}/Ncs \rfloor - 1, \quad N_{CS} \neq 0 \\ 0 & Ncs = 0; \end{cases}$$

$C_v$ value beginning with other position may be deduced by analogy.

Wherein, Ncs is cyclic shift amount, which can also be called cyclic shift step size, $C_v$ is cyclic shift generated according to cyclic shift step size, $N_{ZC}$ is the length of ZC sequence. The above Ncs belongs to set {2, 4, 6, 8, 10, 12, 15}.

Further, after generating cyclic shift sequences according to above method, some cyclic shift sequences can be limited to become random access preamble according to certain cyclic shift limit criterion, i.e. only part of cyclic shift sequences can be selected to be random access preamble.

Hereinafter preferable Ncs set generated according to the method of the present invention is described.

Embodiment 1

If R is 1.4 km, Tpre=133 us, Npre=139 or 137, Tds=5.2 us, Ncs_th=7, M=64, P=4, then
according to the method of the present invention, Ncs_min=7, Ncs_max=15, then the initial Ncs set is {7, 8, 9, 10, 11, 12, 13, 14, 15}, the corresponding Nr is {4, 4, 5, 5, 6, 6, 7, 8, 8}, and the optional Ncs set after being screened is {8, 10, 12, 13, 15}, because the number of elements in the set is greater than P, select {8, 10, 12, 15} as the final Ncs set.

Embodiment 2

If R is 1.4 km, Tpre=133 us, Npre=139 or 137, Tds=5.2 us, Ncs_th=7, M=64, P=2, then
according to the method of the present invention, Ncs_min=7, Ncs_max=15, then optional Ncs set is {7, 8, 9, 10, 11, 12, 13, 14, 15}, the corresponding Nr is {4, 4, 5, 5, 6, 6, 7, 8, 8}, and the optional Ncs set after being screened is {8, 10, 12, 13, 15}, because the number of elements in the set is greater than P, select {8, 15} as the final Ncs set.

Embodiment 3

If R is 1.4 km, Tpre=133 us, Npre=139 or 137, Tds=5.2 us, Ncs_th=7, M=64, P=3, then
according to the method of the present invention, Ncs_min=7, Ncs_max=15, then optional Ncs set is {7, 8, 9, 10, 11, 12, 13, 14, 15}, the corresponding Nr is {4, 4, 5, 5, 6, 6, 7, 8, 8}, and the optional Ncs set after being screened is {8, 10, 12, 13, 15}, because the number of elements in the set is greater than P, select {8, 10, 15} as the final Ncs set.

Embodiment 4

If R is 1.4 km, Tpre=133 us, Npre=139 or 137, Tds=5.2 us, Ncs_th=7, M=64, P=1, then
according to the method of the present invention, Ncs_min=7, Ncs_max=15, then optional Ncs set is {7, 8, 9, 10, 11, 12, 13, 14, 15}, the corresponding Nr is {4, 4, 5, 5, 6, 6, 7, 8, 8}, and the optional Ncs set after being screened is {8, 10, 12, 13, 15}, because the number of elements in the set is greater than P, select {15} as the final Ncs set.

Embodiment 5

If R is 1.55 km, Tpre=133 us, Npre=139 or 137, Tds=5.2 us, Ncs_th=7, M=64, P=1, then
according to the method of the present invention, Ncs_min=7, Ncs_max=16, then optional Ncs set is {7, 8, 9, 10, 11, 12, 13, 14, 15, 16}, the corresponding Nr is {4, 4, 5, 5, 6, 6, 7, 8, 8, 8}, and the optional Ncs set after being screened is {8, 10, 12, 13, 16}, because the number of elements in the set is greater than P, select {16} as the final Ncs set.

Embodiment 6

If R is 1.26 km, Tpre=133 us, Npre=139 or 137, Tds=5.2 us, Ncs_th=7, M=64, P=1, then
according to the method of the present invention, Ncs_min=7, Ncs_max=14, then optional Ncs set is {7, 8, 9, 10, 11, 12, 13, 14}, the corresponding Nr is {4, 4, 5, 5, 6, 6, 7, 8}, and the optional Ncs set after being screened is {8, 10, 12, 13, 14}, because the number of elements in the set is greater than P, select {14} as the final Ncs set.

Embodiment 7

If R is 1.11 km, Tpre=133 us, Npre=139 or 137, Tds=5.2 us, Ncs_th=7, M=64, P=1, then
according to the method of the present invention, Ncs_min=7, Ncs_max=13, then optional Ncs set is {7, 8, 9, 10, 11, 12, 13}, the corresponding Nr is {4, 4, 5, 5, 6, 6, 7}, and the optional Ncs set after being screened is {8, 10, 12, 13}, because the number of elements in the set is greater than P, select {13} as the final Ncs set.

Embodiment 8

If R is 1.0 km, Tpre=133 us, Npre=139 or 137, Tds=5.2 us, Ncs_th=7, M=64, P=1, then
according to the method of the present invention, Ncs_min=7, Ncs_max=12, then optional Ncs set is {7, 8, 9, 10, 11, 12}, the corresponding Nr is {4, 4, 5, 5, 6, 6}, and the optional Ncs set after being screened is {8, 10, 12}, because the number of elements in the set is greater than P, select {12} as the final Ncs set.

Embodiment 9

If R is 0.82 km, Tpre=133 us, Npre=139 or 137, Tds=5.2 us, Ncs_th=7, M=64, P=1, then
according to the method of the present invention, Ncs_min=7, Ncs_max=11, then optional Ncs set is {7, 8, 9, 10, 11}, the corresponding Nr is {4, 4, 5, 5, 6}, and the optional Ncs set after being screened is {8, 10, 11}, because the number of elements in the set is greater than P, select {11} as the final Ncs set.

Embodiment 10

If R is 0.68 km, Tpre=133 us, Npre=139 or 137, Tds=5.2 us, Ncs_th=7, M=64, P=1, then
according to the method of the present invention, Ncs_min=7, Ncs_max=10, then optional Ncs set is {7, 8, 9, 10}, the corresponding Nr is {4, 4, 5, 5}, and the optional Ncs set after being screened is {8, 10}, because the number of elements in the set is greater than P, select {10} as the final Ncs set.

Embodiment 11

If R is 0.53 km, Tpre=133 us, Npre=139 or 137, Tds=5.2 us, Ncs_th=7, M=64, P=1, then
according to the method of the present invention, Ncs_min=7, Ncs_max=9, then optional Ncs set is {7, 8, 9}, the corresponding Nr is {4, 4, 5}, and the optional Ncs set after being screened is {8, 9}, because the number of elements in the set is greater than P, select {9} as the final Ncs set.

Embodiment 12

If R is 0.39 km, Tpre=133 us, Npre=139 or 137, Tds=5.2 us, Ncs_th=7, M=64, P=1, then according to the method of the present invention, Ncs_min=7, Ncs_max=8, then optional Ncs set is {7, 8}, the corresponding Nr is {4, 4}, and the optional Ncs set after being screened is {8}, because the number of elements in the set is equal to P, select {8} as the final Ncs set.

Embodiment 13

If R is 0.24 km, Tpre=133 us, Npre=139 or 137, Tds=5.2 us, Ncs_th=6, M=64, P=1, then according to the method of the present invention, Ncs_min=6, Ncs_max=7, then optional Ncs set is {6, 7}, the corresponding Nr is {3, 4}, and the optional Ncs set after being screened is {6, 7}, because the number of elements in the set is greater than P, select {7} as the final Ncs set.

Embodiment 14

If R is 0.1 km, Tpre=133 us, Npre=139 or 137, Tds=5.2 us, Ncs_th=6, M=64, P=1, then according to the method of the present invention, Ncs_min=6, Ncs_max=6, then optional Ncs set is {6}, the corresponding Nr is {3}, and the optional Ncs set after being screened is {6}, because the number of elements in the set is equal to P, select {6} as the final Ncs set.

Embodiment 15

If R is 1.55 km, Tpre=133 us, Npre=139 or 137, Tds=5.2 us, Ncs_th=6, M=64, P=4, then according to the method of the present invention, Ncs_min=6, Ncs_max=16, then optional Ncs set is {6, 7, 8, 9, 10, 11, 12, 13, 14, 15, 16}, the corresponding Nr is {3, 4, 4, 5, 5, 6, 6, 7, 8, 8, 8}, and the optional Ncs set after being screened is {6, 8, 10, 12, 13, 16}, because the number of elements in the set is greater than P, select {6, 8, 10, 16} as the final Ncs set.

Embodiment 16

If R is 1.4 km, Tpre=133 us, Npre=139 or 137, Tds=5.2 us, Ncs_th=6, M=64, P=4, then according to the method of the present invention, Ncs_min=6, Ncs_max=15, then optional Ncs set is {6, 7, 8, 9, 10, 11, 12, 13, 14, 15}, the corresponding Nr is {3, 4, 4, 5, 5, 6, 6, 7, 8, 8}, and the optional Ncs set after being screened is {6, 8, 10, 12, 13, 15}, because the number of elements in the set is greater than P, select {6, 8, 10, 15} as the final Ncs set.

Embodiment 17

If R is 1.4 km, Tpre=133 us, Npre=139 or 137, Tds=5.2 us, Ncs_th=6, M=64, P=2, then according to the method of the present invention, Ncs_min=6, Ncs_max=15, then optional Ncs set is {6, 7, 8, 9, 10, 11, 12, 13, 14, 15}, the corresponding Nr is {3, 4, 4, 5, 5, 6, 6, 7, 8, 8}, and the optional Ncs set after being screened is {6, 8, 10, 12, 13, 15}, because the number of elements in the set is greater than P, select {6, 15} as the final Ncs set.

Embodiment 18

If R is 1.4 km, Tpre=133 us, Npre=139 or 137, Tds=5.2 us, Ncs_th=6, M=64, P=3, then according to the method of the present invention, Ncs_min=6, Ncs_max=15, then optional Ncs set is {6, 7, 8, 9, 10, 11, 12, 13, 14, 15}, the corresponding Nr is {3, 4, 4, 5, 5, 6, 6, 7, 8, 8}, and the optional Ncs set after being screened is {6, 8, 10, 12, 13, 15}, because the number of elements in the set is greater than P, select {6, 8, 15} as the final Ncs set.

Embodiment 19

If R is 1.4 km, Tpre=133 us, Npre=139 or 137, Tds=5.2 us, Ncs_th=6, M=16, P=2, then according to the method of the present invention, Ncs_min=6, Ncs_max=15, then optional Ncs set is {6, 7, 8, 9, 10, 11, 12, 13, 14, 15}, the corresponding Nr is {1, 1, 1, 2, 2, 2, 2, 2, 2, 2}, and the optional Ncs set after being screened is {8, 15}, because the number of elements in the set is equal to P, select {8, 15} as the final Ncs set.

Embodiment 20

If R is 1.4 km, Tpre=133 us, Npre=139 or 137, Tds=5.2 us, Ncs_th=6, M=16, P=1, then according to the method of the present invention, Ncs_min=6, Ncs_max=15, then optional Ncs set is {6, 7, 8, 9, 10, 11, 12, 13, 14, 15}, the corresponding Nr is {1, 1, 1, 2, 2, 2, 2, 2, 2, 2}, and the optional Ncs set after being screened is {8, 15}, because the number of elements in the set is greater than P, select {15} as the final Ncs set.

Embodiment 21

If R is 0.4 km, Tpre=133 us, Npre=139 or 137, Tds=5.2 us, Ncs_th=6, M=16, P=1, then according to the method of the present invention, Ncs_min=6, Ncs_max=8, then optional Ncs set is {6, 7, 8}, the corresponding Nr is {1, 1, 1}, and the optional Ncs set after being screened is {8}, because the number of elements in the set is equal to P, select {8} as the final Ncs set.

Embodiment 22

If R is 1.6 km, Tpre=133 us, Npre=139 or 137, Tds=5.2 us, Ncs_th=6, M=16, P=2, then according to the method of the present invention, Ncs_min=6, Ncs_max=16, then optional Ncs set is {6, 7, 8, 9, 10, 11, 12, 13, 14, 15, 16}, the corresponding Nr is {1, 1, 1, 2, 2, 2, 2, 2, 2, 2, 2}, and the optional Ncs set after being screened is {8, 16}, because the number of elements in the set is equal to P, select {8, 16} as the final Ncs set.

Embodiment 23

If R is 1.6 km, Tpre=133 us, Npre=139 or 137, Tds=5.2 us, Ncs_th=6, M=16, P=1, then according to the method of the present invention, Ncs_min=6, Ncs_max=16, then optional Ncs set is {6, 7, 8, 9, 10, 11, 12, 13, 14, 15, 16}, the corresponding Nr is {1, 1, 1, 2, 2, 2, 2, 2, 2, 2, 2}, and the optional Ncs set after being screened is {8, 16}, because the number of elements in the set is greater than P, select {16} as the final Ncs set.

Embodiment 24

If R is 1.5 km, Tpre=133 us, Npre=139 or 137, Tds=0, Ncs_th=2, M=16, P=2, then
according to the method of the present invention, Ncs_min=2, Ncs_max=10, then optional Ncs set is {2, 3, 4, 5, 6, 7, 8, 9, 10}, the corresponding Nr is {1, 1, 1, 1, 1, 1, 1, 2, 2}, and the optional Ncs set after being screened is {8, 10}, because the number of elements in the set is equal to P, select {8, 10} as the final Ncs set.

Embodiment 25

If R is 1.2 km, Tpre=133 us, Npre=139 or 137, Tds=0, Ncs_th=2, M=16, P=2, then
according to the method of the present invention, Ncs_min=2, Ncs_max=8, then optional Ncs set is {2, 3, 4, 5, 6, 7, 8}, the corresponding Nr is {1, 1, 1, 1, 1, 1, 1}, and the optional Ncs set after being screened is {8}, because the number of elements in the set is less than P, select {8} as the final Ncs set.

Embodiment 26

If R is 1.5 km, Tpre=133 us, Npre=139 or 137, Tds=0, Ncs_th=2, M=16, P=1, then
according to the method of the present invention, Ncs_min=2, Ncs_max=1, then optional Ncs set is {2, 3, 4, 5, 6, 7, 8, 9, 10}, the corresponding Nr is {1, 1, 1, 1, 1, 1, 1, 2, 2}, and the optional Ncs set after being screened is {8, 10}, because the number of elements in the set is greater than P, select {10} as the final Ncs set.

Embodiment 27

If R is 1.5 km, Tpre=133 us, Npre=139 or 137, Tds=0, Ncs_th=2, M=64, P=4, then
according to the method of the present invention, Ncs_min=2, Ncs_max=10, then optional Ncs set is {2, 3, 4, 5, 6, 7, 8, 9, 10}, the corresponding Nr is {1, 2, 2, 3, 3, 4, 4, 5, 5}, and the optional Ncs set after being screened is {2, 4, 6, 8, 10}, because the number of elements in the set is greater than P, select {2, 4, 6, 10} as the final Ncs set.

Embodiment 28

If R is 1.0 km, Tpre=133 us, Npre=139 or 137, Tds=5.2 us, Ncs_th=7, M=64, P=2, then
according to the method of the present invention, Ncs_min=7, Ncs_max=12, then optional Ncs set is {7, 8, 9, 10, 11, 12}, the corresponding Nr is {4, 4, 5, 5, 6, 6}, and the optional Ncs set after being screened is {8, 10, 12}, because the number of elements in the set is greater than P, select {8, 12} as the final Ncs set.

Embodiment 29

If R is 1.11 km, Tpre=133 us, Npre=139 or 137, Tds=5.2 us, Ncs_th=7, M=64, P=2, then
according to the method of the present invention, Ncs_min=7, Ncs_max=13, then optional Ncs set is {7, 8, 9, 10, 11, 12, 13}, the corresponding Nr is {4, 4, 5, 5, 6, 6, 7}, the optional Ncs set after being screened is {8, 10, 12, 13}, because the number of elements in the set is greater than P, select {8, 13} as the final Ncs set.

Embodiment 30

If R is 1.26 km, Tpre=133 us, Npre=139 or 137, Tds=5.2 us, Ncs_th=7, M=64, P=2, then
according to the method of the present invention, Ncs_min=7, Ncs_max=14, then optional Ncs set is {7, 8, 9, 10, 11, 12, 13, 14}, the corresponding Nr is {4, 4, 5, 5, 6, 6, 7, 8}, and the optional Ncs set after being screened is {8, 10, 12, 13, 14}, because the number of elements in the set is greater than P, select {8, 14} as the final Ncs set.

Embodiment 31

If R is 1.5 km, Tpre=133 us, Npre=139 or 137, Tds=0, Ncs_th=6, M=64, P=2, then
according to the method of the present invention, Ncs_min=6, Ncs_max=10, then optional Ncs set is {6, 7, 8, 9, 10}, the corresponding Nr is {3, 4, 4, 5, 5}, and the optional Ncs set after being screened is {6, 8, 10}, because the number of elements in the set is greater than P, select {6, 10} as the final Ncs set.

Embodiment 32

If R is 1.5 km, Tpre=133 us, Npre=139 or 137, Tds=0, Ncs_th=4, M=64, P=2, then
according to the method of the present invention, Ncs_min=4, Ncs_max=10, then optional Ncs set is {4, 5, 6, 7, 8, 9, 10}, the corresponding Nr is {2, 3, 3, 4, 4, 5, 5}, and the optional Ncs set after being screened is {4, 6, 8, 10}, because the number of elements in the set is greater than P, select {4, 10} as the final Ncs set.

Embodiment 33

If R is 1.5 km, Tpre=133 us, Npre=139 or 137, Tds=0, Ncs_th=2, M=64, P=2, then
according to the method of the present invention, Ncs_min=2, Ncs_max=10, then optional Ncs set is {2, 3, 4, 5, 6, 7, 8, 9, 10}, the corresponding Nr is {1, 2, 2, 3, 3, 4, 4, 5, 5}, and the optional Ncs set after being screened is {2, 4, 6, 8, 10}, because the number of elements in the set is greater than P, select {2, 10} as the final Ncs set.

Embodiment 34

If R is 1.2 km, Tpre=133 us, Npre=139 or 137, Tds=0, Ncs_th=2, M=64, P=4, then
according to the method of the present invention, Ncs_min=2, Ncs_max=8, then optional Ncs set is {2, 3, 4, 5, 6, 7, 8}, the corresponding Nr is {1, 2, 2, 3, 3, 4, 4}, and the optional Ncs set after being screened is {2, 4, 6, 8}, because the number of elements in the set is equal to P, select {2, 4, 6, 8} as the final Ncs set.

Embodiment 35

If R is 1.5 km, Tpre=133 us, Npre=139 or 137, Tds=0, Ncs_th=4, M=64, P=4, then
according to the method of the present invention, Ncs_min=4, Ncs_max=10, then optional Ncs set is {4, 5, 6, 7, 8, 9, 10}, the corresponding Nr is {2, 3, 3, 4, 4, 5, 5}, and the optional Ncs set after being screened is {4, 6, 8, 10}, because the number of elements in the set is equal to P, select {4, 6, 8, 10} as the final Ncs set.

Embodiment 36

If R is 1.2 km, Tpre=133 us, Npre=139 or 137, Tds=0, Ncs_th=6, M=64, P=2, then according to the method of the present invention, Ncs_min=6, Ncs_max=8, then optional Ncs set is {6, 7, 8}, the corresponding Nr is {3, 4, 4}, and the optional Ncs set after being screened is {6, 8}, because the number of elements in the set is equal to P, select {6, 8} as the final Ncs set.

Embodiment 37

If R is 1.2 km, Tpre=133 us, Npre=139 or 137, Tds=0, Ncs_th=4, M=64, P=2, then according to the method of the present invention, Ncs_min=4, Ncs_max=8, then optional Ncs set is {4, 5, 6, 7, 8}, the corresponding Nr is {2, 3, 3, 4, 4}, and the optional Ncs set after being screened is {4, 6, 8}, because the number of elements in the set is greater than P, select {4, 8} as the final Ncs set.

Embodiment 38

If R is 1.2 km, Tpre=133 us, Npre=139 or 137, Tds=0, Ncs_th=2, M=64, P=2, then according to the method of the present invention, Ncs_min=2, Ncs_max=8, then optional Ncs set is {2, 3, 4, 5, 6, 7, 8}, the corresponding Nr is {1, 2, 2, 3, 3, 4, 4}, and the optional Ncs set after being screened is {2, 4, 6, 8}, because the number of elements in the set is greater than P, select {2, 8} as the final Ncs set.

Embodiment 39

If R is 0.9 km, Tpre=133 us, Npre=139 or 137, Tds=0, Ncs_th=2, M=64, P=2, then according to the method of the present invention, Ncs_min=2, Ncs_max=6, then optional Ncs set is {2, 3, 4, 5, 6}, the corresponding Nr is {1, 2, 2, 3, 3}, and the optional Ncs set after being screened is {2, 4, 6}, because the number of elements in the set is greater than P, select {2, 6} as the final Ncs set.

Embodiment 40

If R is 0.9 km, Tpre=133 us, Npre=139 or 137, Tds=0, Ncs_th=4, M=64, P=2, then according to the method of the present invention, Ncs_min=4, Ncs_max=6, then optional Ncs set is {4, 5, 6}, the corresponding Nr is {2, 3, 3}, and the optional Ncs set after being screened is {4, 6}, because the number of elements in the set is equal to P, select {4, 6} as the final Ncs set.

Embodiment 41

If R is 0.6 km, Tpre=133 us, Npre=139 or 137, Tds=0, Ncs_th=2, M=64, P=2, then according to the method of the present invention, Ncs_min=2, Ncs_max=4, then optional Ncs set is {2, 3, 4}, the corresponding Nr is {1, 2, 2}, and the optional Ncs set after being screened is {2, 4}, because the number of elements in the set is equal to P, select {2, 4} as the final Ncs set.

Embodiment 42

If R is 0.6 km, Tpre=133 us, Npre=139 or 137, Tds=0, Ncs_th=2, M=64, P=1, then according to the method of the present invention, Ncs_min=2, Ncs_max=4, then optional Ncs set is {2, 3, 4}, the corresponding Nr is {1, 2, 2}, and the optional Ncs set after being screened is {2, 4}, because the number of elements in the set is greater than P, select {4} as the final Ncs set.

Embodiment 43

If R is 0.3 km, Tpre=133 us, Npre=139 or 137, Tds=0, Ncs_th=2, M=64, P=1, then according to the method of the present invention, Ncs_min=2, Ncs_max=2, then optional Ncs set is {2}, the corresponding Nr is {1}, and the optional Ncs set after being screened is {2}, because the number of elements in the set is equal to P, select {2} as the final Ncs set.

Embodiment 44

If R is 2.2 km, Tpre=133 us, Npre=139 or 137, Tds=0 us, Ncs_th=2, M=64, P=7, then according to the method of the present invention, Ncs_min=2, Ncs_max=15, then optional Ncs set is {2, 3, 4, 5, 6, 7, 8, 9, 10, 11, 12, 13, 14, 15}, the corresponding Nr is {1, 2, 2, 3, 3, 4, 4, 5, 5, 6, 6, 7, 8, 8}, and the optional Ncs set after being screened is {2, 4, 6, 8, 10, 12, 13, 15}, because the number of elements in the set is greater than P, select {2, 4, 6, 8, 10, 12, 15} as the final Ncs set.

Embodiment 45

If R is 2.2 km, Tpre=133 us, Npre=139 or 137, Tds=0 us, Ncs_th=2, M=64, P=8, then according to the method of the present invention, Ncs_min=2, Ncs_max=15, then optional Ncs set is {2, 3, 4, 5, 6, 7, 8, 9, 10, 11, 12, 13, 14, 15}, the corresponding Nr is {1, 2, 2, 3, 3, 4, 4, 5, 5, 6, 6, 7, 8, 8}, and the optional Ncs set after being screened is {2, 4, 6, 8, 10, 12, 13, 15}, because the number of elements in the set is equal to P, select {2, 4, 6, 8, 10, 12, 13, 15} as the final Ncs set.

The above discussions are only the embodiments of the present invention. The invention should not be construed as limited to the embodiments illustrated above. The present invention can have all kinds of modifications and changes for those skilled in the art. Any modifications, substitute or improvements without departing from the spirit and principles of the present invention are deemed to be included in the scope of the present invention, as defined by the claims.

INDUSTRIAL APPLICABILITY

Ncs set generated by the method of the present invention can satisfy the maximal covering demand of the system. Meanwhile, under the condition of different covering demands, a suitable Ncs can be selected to make ZC sequence reuse factor reach the maximum and make generated preambles reach the highest orthogonal probability, therefore interference between and in cells is decreased.

What is claimed is:

1. A method for generation of cyclic shift amount set, comprising the following steps:
   A: determining an upper limit value Ncs_max of cyclic shift amount Ncs according to a maximum cell radius value which is required to be supported by a random access channel RACH, and selecting Ncs values which are less than or equal to the Ncs_max to be elements of an initial Ncs set;
   B: calculating a root sequence number Nr corresponding to each element in the initial Ncs set according to formula Nr=⌈M/⌊Npre/Ncs⌋⌉; and deleting elements in the initial Ncs set which have the same Nr value with other elements so as to generate a screening Ncs set in which each element has a different Nr value;
   C: if N, the number of elements in the screening Ncs set, is greater than P, the number of maximum Ncs supported by the system, then deleting N−P elements from the set so as to generate a final Ncs set; else regarding the screening Ncs set as the final Ncs set;
   D: at a base station, informing a mobile phone about an available step size of cyclic shift indicated by an element of the final Ncs set;
   wherein, M is a preamble number required by each cell; Npre is the length of preamble sequence.

2. The method according to claim 1, wherein,
in the step A, the Ncs values which are greater than or equal to Ncs_min but also less than or equal to Ncs_max are regarded as elements of the initial Ncs set;
wherein, $$\text{Ncs\_min} = \left\lfloor \frac{Tds \times Npre}{Tpre} \right\rfloor;$$

or Ncs_min is the maximum value of $$\left\lfloor \frac{Tds \times Npre}{Tpre} \right\rfloor$$

and defined threshold Ncs_th,
wherein Tds is a length of multipath channel delay spread, and Tpre is a length of a preamble.

3. The method according to claim 1, wherein,
in the step B, for those multiple elements which have the same Nr value in the initial Ncs set, the element which has the minimum Ncs value is reserved, the other elements are deleted, and the screening Ncs set in which each element has a different Nr value is generated.

4. The method according to claim 1, wherein,
in the step C, if the N is greater than the P, P−1 Ncs values arranged from low to high in the screening Ncs set and the maximum Ncs value in the screening Ncs set are regarded as elements of the final Ncs set, and the other N−P elements are deleted.

5. The method according to claim 1, wherein,
if R=1.4 km, Tpre=133 us, Npre=139 or 137, Tds=5.2 us, Ncs_th=7, M=64, P=4, then the final Ncs set is {8, 10, 12, 15};
if R=1.4 km, Tpre=133 us, Npre=139 or 137, Tds=5.2 us, Ncs_th=7, M=64, P=2, then the final Ncs set is {8, 15};
if R=1.4 km, Tpre=133 us, Npre=139 or 137, Tds=5.2 us, Ncs_th=7, M=64, P=3, then the final Ncs set is {8, 10, 15};
if R=1.4 km, Tpre=133 us, Npre=139 or 137, Tds=5.2 us, Ncs_th=7, M=64, P=1, then the final Ncs set is {15};
if R=1.55 km, Tpre=133 us, Npre=139 or 137, Tds=5.2 us, Ncs_th=7, M=64, P=1, then the final Ncs set is {16};
if R=1.26 km, Tpre=133 us, Npre=139 or 137, Tds=5.2 us, Ncs_th=7, M=64, P=1, then the final Ncs set is {14};
if R=1.11 km, Tpre=133 us, Npre=139 or 137, Tds=5.2 us, Ncs_th=7, M=64, P=1, then the final Ncs set is {13};
if R=1.0 km, Tpre=133 us, Npre=139 or 137, Tds=5.2 us, Ncs_th=7, M=64, P=1, then the final Ncs set is {12};
if R=0.82 km, Tpre=133 us, Npre=139 or 137, Tds=5.2 us, Ncs_th=7, M=64, P=1, then the final Ncs set is {11};
if R=0.68 km, Tpre=133 us, Npre=139 or 137, Tds=5.2 us, Ncs_th=7, M=64, P=1, then the final Ncs set is {10};
if R=0.53 km, Tpre=133 us, Npre=139 or 137, Tds=5.2 us, Ncs_th=7, M=64, P=1, then the final Ncs set is {9};
if R=0.39 km, Tpre=133 us, Npre=139 or 137, Tds=5.2 us, Ncs_th=7, M=64, P=1, then the final Ncs set is {8};
if R=0.24 km, Tpre=133 us, Npre=139 or 137, Tds=5.2 us, Ncs_th=6, M=64, P=1, then the final Ncs set is {7};
if R=0.1 km, Tpre=133 us, Npre=139 or 137, Tds=5.2 us, Ncs_th=6, M=64, P=1, then the final Ncs set is {6};
if R=1.55 km, Tpre=133 us, Npre=139 or 137, Tds=5.2 us, Ncs_th=6, M=64, P=4, then the final Ncs set is {6, 8, 10, 16};
if R=1.4 km, Tpre=133 us, Npre=139 or 137, Tds=5.2 us, Ncs_th=6, M=64, P=4, then the final Ncs set is {6, 8, 10, 15};
if R=1.4 km, Tpre=133 us, Npre=139 or 137, Tds=5.2 us, Ncs_th=6, M=64, P=2, then the final Ncs set is {6, 15};
if R=1.4 km, Tpre=133 us, Npre=139 or 137, Tds=5.2 us, Ncs_th=6, M=64, P=3, then the final Ncs set is {6, 8, 15};
if R=1.4 km, Tpre=133 us, Npre=139 or 137, Tds=5.2 us, Ncs_th=6, M=16, P=2, then the final Ncs set is {8, 15};
if R=1.4 km, Tpre=133 us, Npre=139 or 137, Tds=5.2 us, Ncs_th=6, M=16, P=1, then the final Ncs set is {15};
if R=0.4 km, Tpre=133 us, Npre=139 or 137, Tds=5.2 us, Ncs_th=6, M=16, P=1, then the final Ncs set is {8};
if R=1.6 km, Tpre=133 us, Npre=139 or 137, Tds=5.2 us, Ncs_th=6, M=16, P=2, then the final Ncs set is {8, 16};
if R=1.6 km, Tpre=133 us, Npre=139 or 137, Tds=5.2 us, Ncs_th=6, M=16, P=1, then the final Ncs set is {16};
if R=1.5 km, Tpre=133 us, Npre=139 or 137, Tds=0 us, Ncs_th=2, M=16, P=2, then the final Ncs set is {8, 10};
if R=1.2 km, Tpre=133 us, Npre=139 or 137, Tds=0 us, Ncs_th=2, M=16, P=2, then the final Ncs set is {8};
if R=1.5 km, Tpre=133 us, Npre=139 or 137, Tds=0 us, Ncs_th=2, M=16, P=1, then the final Ncs set is {10};
if R=1.5 km, Tpre=133 us, Npre=139 or 137, Tds=0 us, Ncs_th=2, M=64, P=4, then the final Ncs set is {2, 4, 6, 10};
if R=1.0 km, Tpre=133 us, Npre=139 or 137, Tds=5.2 us, Ncs_th=7, M=64, P=2, then the final Ncs set is {8, 12};
if R=1.11 km, Tpre=133 us, Npre=139 or 137, Tds=5.2 us, Ncs_th=7, M=64, P=2, then the final Ncs set is {8, 13};
if R=1.26 km, Tpre=133 us, Npre=139 or 137, Tds=5.2 us, Ncs_th=7, M=64, P=2, then the final Ncs set is {8, 14};
if R=1.5 km, Tpre=133 us, Npre=139 or 137, Tds=0 us, Ncs_th=6, M=64, P=2, then the final Ncs set is {6, 10};
if R=1.5 km, Tpre=133 us, Npre=139 or 137, Tds=0 us, Ncs_th=4, M=64, P=2, then the final Ncs set is {4, 10};
if R=1.5 km, Tpre=133 us, Npre=139 or 137, Tds=0 us, Ncs_th=2, M=64, P=2, then the final Ncs set is {2, 10};
if R=1.2 km, Tpre=133 us, Npre=139 or 137, Tds=0 us, Ncs_th=2, M=64, P=4, then the final Ncs set is {2, 4, 6, 8};

if R=1.5 km, Tpre=133 us, Npre=139 or 137, Tds=0 us, Ncs_th=4, M=64, P=4, then the final Ncs set is {4, 6, 8, 10};

if R=1.2 km, Tpre=133 us, Npre=139 or 137, Tds=0 us, Ncs_th=6, M=64, P=2, then the final Ncs set is {6, 8};

if R=1.2 km, Tpre=133 us, Npre=139 or 137, Tds=0 us, Ncs_th=4, M=64, P=2, then the final Ncs set is {4, 8};

if R=1.2 km, Tpre=133 us, Npre=139 or 137, Tds=0 us, Ncs_th=2, M=64, P=2, then the final Ncs set is {2, 8};

if R=0.9 km, Tpre=133 us, Npre=139 or 137, Tds=0 us, Ncs_th=2, M=64, P=2, then the final Ncs set is {2, 6};

if R=0.9 km, Tpre=133 us, Npre=139 or 137, Tds=0 us, Ncs_th=4, M=64, P=2, then the final Ncs set is {4, 6};

if R=0.6 km, Tpre=133 us, Npre=139 or 137, Tds=0 us, Ncs_th=2, M=64, P=2, then the final Ncs set is {2, 4};

if R=0.6 km, Tpre=133 us, Npre=139 or 137, Tds=0 us, Ncs_th=2, M=64, P=1, then the final Ncs set is {4};

if R=0.3 km, Tpre=133 us, Npre=139 or 137, Tds=0 us, Ncs_th=2, M=64, P=1, then the final Ncs set is {2};

if R=2.2 km, Tpre=133 us, Npre=139 or 137, Tds=0 us, Ncs_th=2, M=64, P=7, then the final Ncs set is {2, 4, 6, 8, 10, 12, 15}; and if R=2.2 km, Tpre=133 us, Npre=139 or 137, Tds=0 us, Ncs_th=2, M=64, P=8, then the final Ncs set is {2, 4, 6, 8, 10, 12, 13, 15};

wherein R is the maximum cell radius value which is required to be supported by the random access channel, Tpre is a length of a preamble, Tds is a length of multi-path channel delay spread, and Ncs-th is a defined threshold.

6. The method according to claim 1, wherein, one of the following sets is used as the final Ncs set:
{8, 10, 12, 15}; {8, 15}; {8, 10, 15}; {15}; {16}; {14}; {13}; {12}; {11}; {10}; {9}; {8}; {7}; {6}; {6, 8, 10, 16}; {6, 8, 10, 15}; {6, 15}; {6, 8, 15}; {8, 15}; {15}; {8}; {8, 16}; {16}; {8, 10}; {8}; {10}; {2, 4, 6, 10}; {8, 12}; {8, 13}; {8, 14}; {6, 10}; {4, 10}; {2, 10}; {2, 4, 6, 8}; {4, 6, 8, 10}; {6, 8}; {4, 8}; {2, 8}; {2, 6}; {4, 6}; {2, 4}; {4}; {2}; {2, 4, 6, 8, 10, 12, 15}; {2, 4, 6, 8, 10, 12, 13, 15}.

7. The method according to claim 1, wherein, in the step A, the following formula is used to calculate the Ncs_max:

$$\text{Ncs\_max} = \left\lfloor \frac{(R \times 6.7 + Tds) \times Npre}{Tpre} \right\rfloor;$$

wherein, R is the maximum cell radius value which is required to be supported by the random access channel, Tpre is the length of the preamble, and Tds is the length of multi-path channel delay spread.

8. The method according to claim 1, wherein, in the step B, for those multiple elements which have the same Nr value in the initial Ncs set, the element which has the maximum Ncs value is reserved, the other elements are deleted, and the screening Ncs set in which each element has a different Nr value is generated.

9. The method according to claim 1, wherein, in the step C, if the N is greater than the P, then
P-1 Ncs values arranged from high to low in the screening Ncs set and the minimum Ncs value in the screening Ncs set are regarded as elements of the final Ncs set, and the other N-P elements are deleted; or P Ncs values arranged from high to low in the screening Ncs set are regarded as elements of the final Ncs set, and the other N-P elements are deleted; or P Ncs values arranged from low to high in the screening Ncs set are regarded as elements of the final Ncs set, and the other N-P elements are deleted.

10. The method according to claim 2, wherein, in the step C, if the N is greater than the P, P-1 Ncs values arranged from low to high in the screening Ncs set and the maximum Ncs value in the screening Ncs set are regarded as elements of the final Ncs set, and the other N-P elements are deleted.

11. The method according to claim 3, wherein, in the step C, if the N is greater than the P, P-1 Ncs values arranged from low to high in the screening Ncs set and the maximum Ncs value in the screening Ncs set are regarded as elements of the final Ncs set, and the other N-P elements are deleted.

12. The method according to claim 2, wherein, in the step A, the following formula is used to calculate the Ncs_max:

$$\text{Ncs\_max} = \left\lfloor \frac{(R \times 6.7 + Tds) \times Npre}{Tpre} \right\rfloor;$$

wherein, R is the maximum cell radius value which is required to be supported by the random access channel, Tpre is the length of the preamble, and Tds is the length of multi-path channel delay spread.

13. The method according to claim 2, wherein, in the step C, if the N is greater than the P, then
P-1 Ncs values arranged from high to low in the screening Ncs set and the minimum Ncs value in the screening Ncs set are regarded as elements of the final Ncs set, and the other N-P elements are deleted; or P Ncs values arranged from high to low in the screening Ncs set are regarded as elements of the final Ncs set, and the other N-P elements are deleted; or P Ncs values arranged from low to high in the screening Ncs set are regarded as elements of the final Ncs set, and the other N-P elements are deleted.

14. The method according to claim 3, wherein, in the step C, if the N is greater than the P, then
P-1 Ncs values arranged from high to low in the screening Ncs set and the minimum Ncs value in the screening Ncs set are regarded as elements of the final Ncs set, and the other N-P elements are deleted; or P Ncs values arranged from high to low in the screening Ncs set are regarded as elements of the final Ncs set, and the other N-P elements are deleted; or P Ncs values arranged from low to high in the screening Ncs set are regarded as elements of the final Ncs set, and the other N-P elements are deleted.

15. A method for generation of random access preamble, comprising:
selecting, by a base station, a cyclic shift amount Ncs from a cyclic shift amount set, and
cyclically shifting v×Ncs for root Zadoff-Chu sequence at a predefined start point so as to generate a random access preamble of the root Zadoff-Chu sequence, wherein a length of the random access preamble is 139 or 137;
wherein, $$v = 0, 1, \ldots, \lfloor N_{ZC}/Ncs \rfloor - 1, \quad Ncs \neq 0;$$

$N_{ZC}$ is the length of the root Zadoff-Chu sequence; the cyclic shift amount set is {2, 4, 6, 8, 10, 12, 15}, wherein the cyclic shift amount set is generated through the following steps:

A: determining an upper limit value Ncs max of cyclic shift amount Ncs according to a maximum cell radius value which is required to be supported by a random access channel RACH, and selecting Ncs values which are less than or equal to the Ncs_max to be elements of an initial Ncs set;

B: calculating a root sequence number Nr corresponding to each element in the initial Ncs set according to formula Nr=⌈M/⌊Npre/Ncs⌋⌉; and deleting elements in the initial Ncs set which have the same Nr value with other elements so as to generate a screening Ncs set in which each element has a different Nr value;

C: if N, the number of elements in the screening Ncs set, is greater than P, the number of maximum Ncs supported by the system, then deleting N−P elements from the set so as to generate a final Ncs set; else regarding the screening Ncs set as the final Ncs set;

wherein, M is a preamble number required by each cell; Npre is the length of preamble sequence, wherein, if R=2.2 km, Tpre=133 us, Npre=139 or 137, Tds=0 us, Ncs_th=2, M=64, P=7, then the final Ncs set is {2, 4, 6, 8, 10, 12, 15}.

16. The method according to claim 15, wherein, the predefined start point is 0.

17. A method for generation of random access preamble, comprising:

cyclically shifting v×Ncs for root Zadoff-Chu sequence at a predefined start point so as to generate a random access preamble of the root Zadoff-Chu sequence, and sending, by a mobile phone, the generated random access preamble out, wherein the Ncs is a cyclic shift amount which is selected by a base station from a cyclic shift amount set and sent to the mobile phone, wherein a length of the random access preamble is 139 or 137;

wherein, $$v = 0, 1, \ldots, \lfloor N_{ZC}/Ncs \rfloor - 1, \quad Ncs \neq 0;$$

$N_{ZC}$ is the length of the root Zadoff-Chu sequence; the cyclic shift amount set is {2, 4, 6, 8, 10, 12, 15}, wherein the cyclic shift amount set is generated through the following steps:

A: determining an upper limit value Ncs_max of cyclic shift amount Ncs according to a maximum cell radius value which is required to be supported by a random access channel RACH, and selecting Ncs values which are less than or equal to the Ncs_max to be elements of an initial Ncs set;

B: calculating a root sequence number Nr corresponding to each element in the initial Ncs set according to formula Nr=⌈M/⌊Npre/Ncs⌋⌉; and deleting elements in the initial Ncs set which have the same Nr value with other elements so as to generate a screening Ncs set in which each element has a different Nr value;

C: if N, the number of elements in the screening Ncs set, is greater than P, the number of maximum Ncs supported by the system, then deleting N−P elements from the set so as to generate a final Ncs set; else regarding the screening Ncs set as the final Ncs set;

wherein, M is a preamble number required by each cell; Npre is the length of preamble sequence, wherein, if R=2.2 km, Tpre=133 us, Npre=139 or 137, Tds=0 us, Ncs_th=2, M=64, P=7, then the final Ncs set is {2, 4, 6, 8, 10, 12, 15}.

18. The method according to claim 17, wherein, the predefined start point is 0.

* * * * *